Feb. 15, 1966 E. E. KIMBLERN 3,234,698
STRUCTURALLY RIGID COLLAPSIBLE LINKAGE ASSEMBLY STRUCTURE
Filed April 2, 1962 2 Sheets-Sheet 1
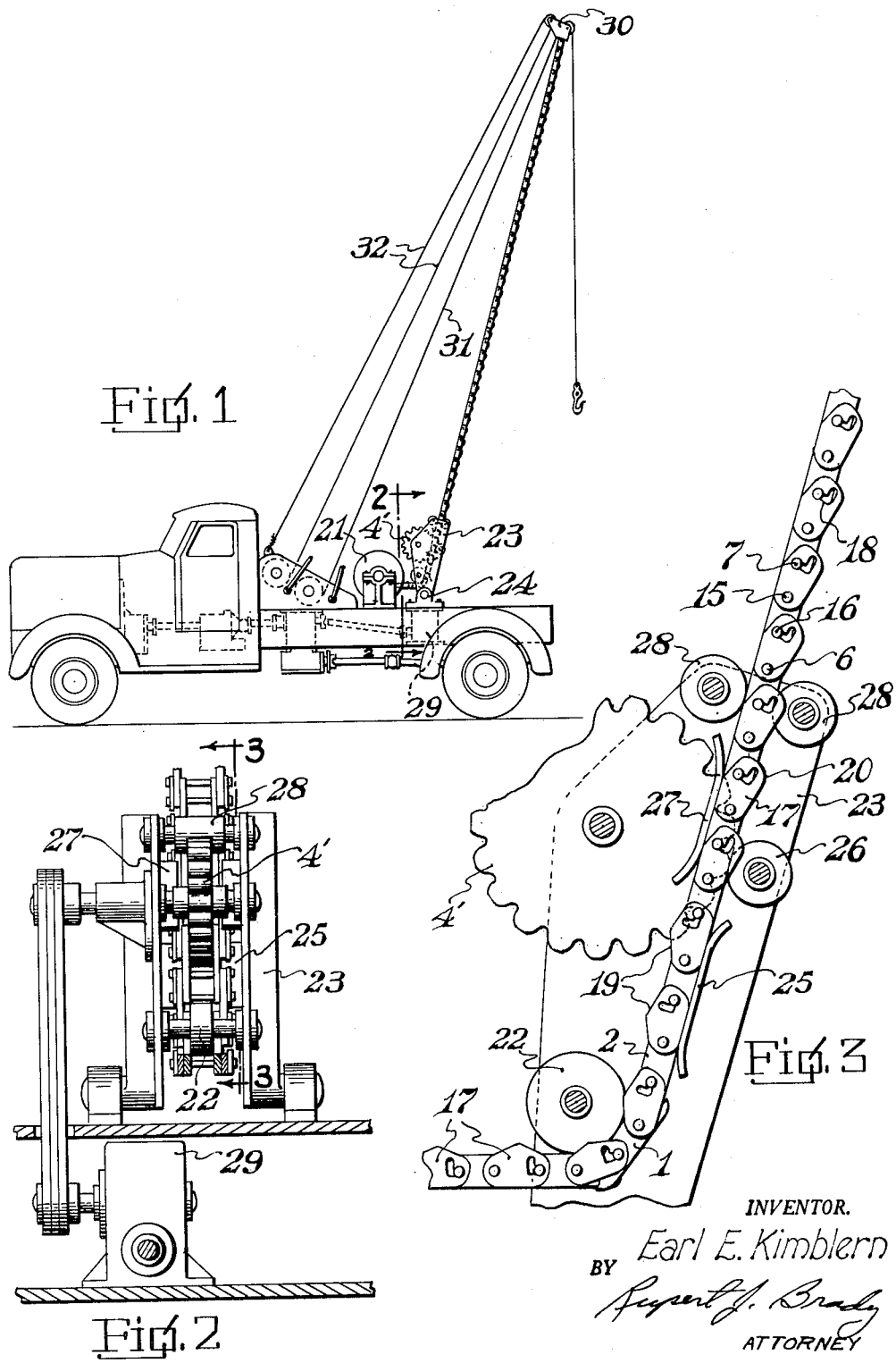
INVENTOR.
Earl E. Kimblern
BY
ATTORNEY Feb. 15, 1966   E. E. KIMBLERN   3,234,698
STRUCTURALLY RIGID COLLAPSIBLE LINKAGE ASSEMBLY STRUCTURE
Filed April 2, 1962   2 Sheets-Sheet 2
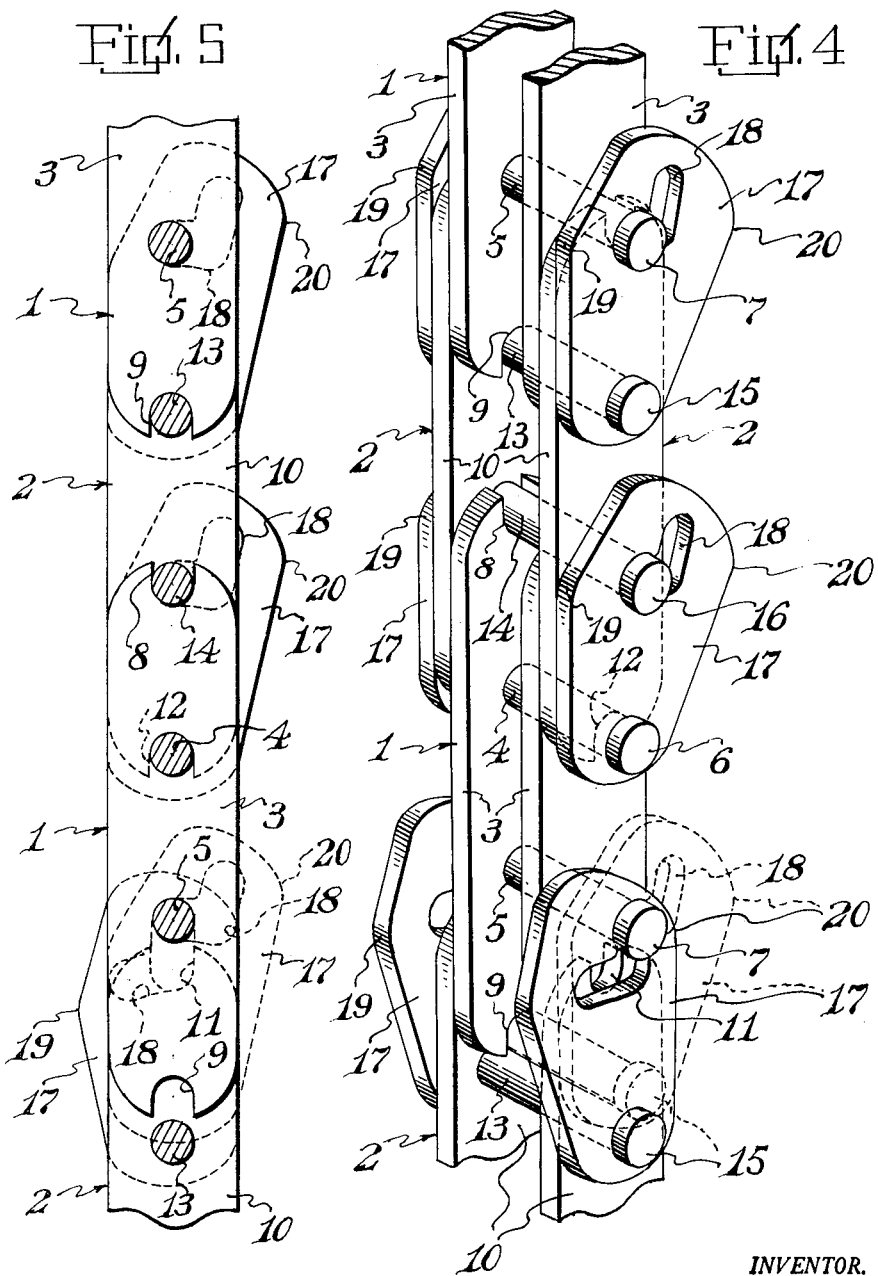
INVENTOR.
Earl E. Kimblern
BY
*Rupert J. Brady*
ATTORNEY

United States Patent Office 3,234,698
Patented Feb. 15, 1966

3,234,698
STRUCTURALLY RIGID COLLAPSIBLE LINKAGE ASSEMBLY STRUCTURE
Earl E. Kimblern, Rte. 3, Box 196, Claremore, Okla.
Filed Apr. 2, 1962, Ser. No. 184,216
8 Claims. (Cl. 52—108)

This invention relates broadly to structurally rigid collapsible linkage assembly structures, and more particularly to a linkage assembly structure or reach which can be selectively made structurally rigid or collapsed for storage.

One of the objects of my invention is to provide a construction of flexible linkage assembly structure or structural member having novel means for quickly and easily rigidly locking the links thereof to provide a structurally rigid member.

Another object of my invention is to provide a construction of reach or the like of the chain linkage type which can be stored on a drum member and which can be easily transformed into a rigid structural member, such as a column or the like, as the same is fed off of the drum.

A further object of my invention is to provide novel means for efficiently rigidly locking adjacent links of a linkage type reach or structural member.

Other and further objects of the invention reside in the adaptability of the linkage assembly structure of the invention to its many uses, one of which is shown by way of example in the specification hereinafter following, and to the mechanism for manipulating the linkage locking means for locking and unlocking adjacent links of the linkage member, as set forth more fully in the specification hereinafter following by reference to the accompanying drawings in which:

FIG. 1 is a side elevational view, for purposes of illustration, showing one use of the linkage assembly structure of the invention;

FIG. 2 is a vertical sectional view taken substantially along line 2—2 of FIG. 1 and particularly showing the mechanism for manipulating the locking means of the linkage assembly structure;

FIG. 3 is a vertical sectional view taken substantially along line 3—3 of FIG. 2;

FIG. 4 is a perspective view of the linkage assembly structure of the invention and particularly showing the linkages thereof in the locked and unlocked positions; and FIG. 5 is a transverse sectional view of FIG. 4.

Referring to the drawings in greater detail, the linkage assembly structure of the invention, as shown particularly in FIGS. 3, 4 and 5, is composed of a multiple number of inner sprocket chain type units or link units, generally designated at 1, and a multiple number of outer sprocket chain type units or link units generally designated at 2, arranged alternately and pivotally connected to each other by suitable interconnecting means to form a chain-like linkage assembly structure connected so that contiguous units or links have limited longitudinal movement with respect to each other. Each inner sprocket chain link unit 1 consists of a pair of elongated side members or portions 3 spaced apart a suitable distance to enable a sprocket wheel 4' to pass therebetween, and secured in this spaced relation by means of a pair of transversely disposed first and second sprocket engaging pins 4 and 5 rigidly connected thereto by welding or the like, and extending beyond the outer surfaces of the side portions 3 on either side thereof and terminating in enlarged head portions 6 and 7 respectively. Both ends of the side portions 3 are provided with recessed notches or terminal recesses 8 and 9 for engaging the outer sprocket link units 2 as will be more fully explained hereinafter following.

The outer sprocket chain type units or link units 2 are constructed in a similar manner to the links 1 and are comprised of side members or portions 10, having notched recesses or terminal recesses 11 and 12 at either end thereof, and rigidly joined in spaced relation by first and second sprocket engaging pins 13 and 14 which extend outwardly of the side portions 10 in a manner similart to pins 4 and 5, and terminate in enlarged head portions 15 and 16, respectively. The side portions 10 are spaced apart a greater distance than the side portions 3 of the inner sprocket links, so that the inner sprocket link can be inserted intermediate the sides 10 of the outer sprocket link as shown more clearly in FIG. 4.

In the linkage assembly structure the inner sprocket links 1 are disposed within the outer sprocket links 2, such that the notched recesses in the ends of the side portions of one link are adapted to engage the transversely disposed sprocket engaging pins of the adjacent link, that is the notched recesses 9 and 8 of the inner sprocket links are adapted to engage sprocket engaging pins 13 and 14 respectively of the outer sprocket links, inwardly of their side portions 10, and notched recesses 11 and 12 of the outer sprocket links are adapted to engage the portions of sprocket engaging pins 5 and 4 respectively of the inner sprocket links, which extend outwardly of the side portions 3. The inner and outer sprocket chain links 1 and 2 are connected to each other by means of pairs of locking members 17 disposed outwardly on either side of the outer sprocket links 2 with a pair positioned at either end of said outer sprocket links. Alternate pairs of locking members 17 are pivotally connected, by means of apertures provided adjacent one end thereof, to sprocket engaging pins 13 of the outer link members 2 and the sprocket engaging pins 4 of the inner link members 1. The enlarged sprocket head portions 15 and 16 serve to maintain the locking member 17 in assembled position. The pairs of substantially planar locking members 17 are provided with substantially or V-shaped lost motion locking longitudinal slots 18 adjacent the opposite ends thereof with the slots 18 with offset positions of respective alternate pairs of locking members respectively engaging the outwardly extending portions of sprocket engaging pins 5 and 14. Engagement of the pins within the slots is maintained by the enlarged head portions 7 and 16, respectively.

In the locked position of the linkage assembly structure as shown by the upper two pairs of locking members 17 in FIGS. 4 and 5, and in phantom in the lower pair of locking members 17, the locking members are pivoted clockwise by pressure applied to the profile cam faces or edges 19 thereof to shorten the longitudinal distance between adjacent sprocket engaging pins of adjacent link members 1 and 2 by moving the sprocket engaging pin engaged by the slots 18 to the portions of the slots nearest the pivot points of the locking members 17, to move the respective notched portions of the link members into locking contact with their respective sprocket engaging pins. The substantially V-shaped slots 18 are disposed on the pairs of locking members 17 at acute angles to the horizontal, such that when the locking members are rotated to the locked position, by pressure applied to the profile cam surfaces 19, the pins 5 and 14 are moved into locked position in one portion of the V-shaped slots and cannot be dislodged therefrom until pressure is applied to the oppositely disposed cam face 20. Thus in the locked position the linkage assembly structure is transformed into a structurally rigid member which can be used for a variety of purposes, such as a crane boom, as shown in FIG. 1, a structural column or beam, etc.

The linkage assembly structure is normally stored on a drum or the like, such as indicated at 21, in FIG. 1, and in the stored position it is necessary that adjacent links 1 and 2 of the assembly be unlocked with respect to each other so that they can pivot respectively to each other to generally conform to the contour of the storage drum. Referring particularly to the bottom pair of locking members 17 in FIGS. 4 and 5, the linkage assembly is returned to its unlocked state by applying a force to the profile cam surface 20 to cause the pair of locking members to be pivoted counterclockwise, moving sprocket engaging pins 5 and 14 from engagement with the locked portion of the V-shaped slots 18 into sliding engagement with the lost motion portions of the slots 18, thus allowing the longitudinal distance between axial centers of sprocket engaging pins 5 and 13; and 14 and 4, to be increased, allowing the notched recesses of the various sprocket links to be moved out of engagement with the various sprocket engaging pins of adjacent links, thus enabling adjacent links 1 and 2 to pivot relative to each other. In this unlocked condition the locking members 17 then performs merely as pivot linkage members pivotally interconnecting the inner and outer sprocket links 1 and 2.

The mechanism for playing-out and reeling-in the linkage assembly structure and for applying forces to the profile cam faces of the pairs of locking members 17 is shown in FIGS. 1–3. In converting the linkage assembly structure from its flexible state to its structural rigid state, the linkage assembly is played-off of its journaled storage drum 21, around guide roller 22, journaled intermediate beam members 23 which may be fulcrumed to a truck bed or the like, as indicated at 24. Guide roller 22 is of a width such that it engages the linkage assembly intermediate the inner sprocket link side portions 3 as they pass thereover. The linkage assembly then passes retract cam shoe 25, connected to beam members 23, which is disposed in sliding contact with the unlocking profile cam surfaces 20 as the unlocked linkage assembly passes thereover. The linkage assembly then passes intermediate guide friction roller 26 and sprocket 4', each journaled intermediate the beam members 23 and arranged so that roller 26 holds the sprocket-engaging pins of the linkage assembly links in contact with the rounded sprocket teeth of sprocket wheel 4' as the linkage assembly passes therebetween. The roller 26 is of such a width as to engage the edge portions of the link units to force the sprocket-engaging pins into engagement with the sprocket teeth.

A pair of locking cam shoes 27, rigidly connected to beams 23 in any suitable manner, are positioned on either side of sprocket 4' immediately adjacent the area of engagement of sprocket 4' and guide roller 26 with the linkage assembly structure. The locking cam shoes 27 are positioned in sliding contact with the edge portions of links 1 and 2 in the path of the profile cam faces 19 of locking members 17 such that as the sprocket rotates counterclockwise the cam faces 19 are forced against locking cam shoes 27 which apply a force to pivot locking members slightly clockwise to their locked position as heretofore explained. The linkage assembly then passes between a pair of stabilizer rollers 28 journaled adjacent the upper edge of beams 23 as shown in FIG. 3. Thus as the linkage assembly leaves engagement with the sprocket 4' when the same is rotated counterclockwise, contiguous links thereof are rigidly interlocked to transform the flexible linkage assembly structure into a structurally rigid linkage assembly structure.

When transforming the linkage assembly into a structurally rigid structure, referring particularly to FIGS. 3 and 5, the sprocket is already engaging a preceding sprocket-engaging pin, such as pin 5, of FIG. 4 and when the succeeding rounded sprocket tooth engages the succeeding pin 13, this pin and its associated link is picked up and together with the resistance of the length of linkage assembly already played-out, the pin is lifted into the notch 9 of the succeeding link while notches 11 are moved into engagement with succeeding pin 5 to shorten the longitudinal distance between the pin being picked up and the preceding pin, and at this point the profile cam surface 19 then moves into contact with locking cam shoe 27 to shift the locking members to complete the linkage locking operation.

In a similar manner, as the rigid linkage assembly structure is reeled-in and returned to the storage roll in a flexible state, the sprocket 4' is rotated clockwise causing the profile cam surfaces 20 to be forced into engagement with retract cam shoe 25 as the linkage structure leaves engagement with the sprocket teeth. Retract cam shoe 25 thus exerts a force on cam surfaces 20 causing locking members 17 to be pivoted counterclockwise to the unlocked position as heretofore explained, allowing the notches of the various links to become disengaged from the respective sprocket-engaging pins so that contiguous links are free to pivot relative to each other so that they may conform to the contour of the storage drum.

It is to be understood that the links 1 and 2, the associated sprocket-engaging pins, and locking members 17, can be made of any desired strength to perform most any function to which they may be adapted. In FIGS. 1 and 2 I have shown the linkage assembly structure adapted for use as a retractable mobile crane boom wherein the beams 23 and storage drum 21 are respectively fulcrumed and journaled to the bed of a truck or the like and the sprocket 4' and storage drum 21 separately driven from power take-offs provided by the truck mechanism, one of which is indicated at 29. A shoe 30 carrying pulleys is provided on the upper end of the linkage assembly to provide a support for a winch-driven working cable 31. Winch-driven support cables, such as illustrated at 32, are also provided as guy wires for supporting and steadying the upper portion of the linkage assembly boom in its erected state. As the linkage assembly structure is played-out or retracted the working cable 31 and support cables 32 are simultaneously played-out or retracted and during this operation the beam members 23 are allowed to pivot about their fulcrum 24.

While I have described my invention in certain preferred embodiments I realize that modifications can be made, and that the linkage assembly structure can be used for many different applications, and I desire that it be understood that no limitations upon my invention are intended other than may be imposed by the scope of the appended claims.

What I claim as new, and desire to secure by Letters Patent of the United States, is as follows:

1. A linkage assembly structure comprising a plurality of link units with each link unit having spaced substantially identical side members with terminal recesses at opposite ends and first and second pins extending through said side members at opposite ends respectively inwardly of the terminal recesses, the ends of the side members of adjacent link units disposed in overlapping relation, means pivotally interconnecting adjacent link units outwardly of the respective side members, each of said interconnecting means defining a pin receiving aperture at one end and at the other end a longitudinal slot having an offset portion, each of said interconnecting means being pivotally connected at said pin receiving aperture to the first pin of one of the adjacent link units, and being shiftably and pivotally connected with the second pin of the other overlapping adjacent link until at said longitudinal slot, adjacent link units being shiftable axially toward each other to thereby permit said terminal recesses at opposite ends of each link unit to displaceably receive the second and first pins respectively of the next adjacent link units at opposite ends thereof, and said offset portion at the longitudinal slot of each interconnecting means displaceably receiving the second pin of the next adjacent link unit upon movement of said interconnecting means about the pivotal connection with said first pin to thereby lock adjacent link units from pivotal movement relative to each other and make said linkage assembly structure rigid.

2. A linkage assembly structure as set forth in claim 1 in which said longitudinal slot having an offset portion is substantially L-shaped.

3. A linkage assembly structure as set forth in claim 1 in which said offset portion is on the inner end of the longitudinal slot.

4. A linkage assembly structure as set forth in claim 1 in which the terminal recess at one end of each side member of one adjacent link unit adjacent the first pin of said link unit receives the second pin of the overlapping link unit adjacent said one end of each side member, and the terminal recess of each side member of said overlapping link unit on the end adajcent the second pin of said overlapping link unit receives the first pin of said one link unit.

5. A linkage assembly structure as set forth in claim 1 in which said side members have longitudinal edges, each of said interconnecting means is disposed parallel with said side members, a pair of cam edges on opposite sides of said interconnecting means, and a different one of said cam edges extending beyond the longitudinal edges of said side members in rigid and non-rigid conditions of said assembly.

6. A linkage assembly structure as set forth in claim 5 in which one of said cam edges is substantially flush with adjacent longitudinal edges of said side members when said second pin is connected in the offset portion of the longitudinal slot.

7. A linkage assembly structure as set forth in claim 1 in which each of said interconnecting means comprises a pair of body portions disposed parallel with, and on opposite sides of the overlapping ends of adjacent links.

8. A linkage assembly structure comprising a plurality of link units with each link unit having spaced substantially identical side members with terminal recesses at opposite ends and first and second pins extending through said members at opposite ends respectively inwardly of the terminal recesses, the ends of the side members of adjacent link units disposed in overlapping relation, substantially planar means pivotally interconecting adjacent link units outwardly of the respective side members, each of said planar interconnecting means defining a pin receiving aperture at one end and at the other end a longitudinal slot having an offset portion, each of said planar interconnecting means being pivotally connected at said pin receiving aperture to the first pin of one of the adjacent link units, and being shiftably and pivotally connected with the second pin of the other overlapping adjacent link unit at said longitudinal slot, adjacent link units being shiftable axially toward each other to thereby permit said terminal recesses at opposite ends of each link unit to displaceably receive the second and first pins respectively of the next adjacent link units at opposite ends thereof, and said offset portion at the longitudinal slot of each planar interconnecting means displaceably receiving the second pin of the next adjacent link unit upon movement of said planar interconnecting means about the pivotal connection with said first pin to thereby lock adjacent link units from pivotal movement relative to each other and make said linkage assembly structure rigid.

References Cited by the Examiner

UNITED STATES PATENTS

| | | | |
|---|---|---|---|
| 2,269,363 | 1/1942 | Farrand | 52—645 |
| 2,896,908 | 7/1959 | Stone | 59—78 X |
| 2,945,391 | 7/1960 | Cookson | 59—78 X |

FOREIGN PATENTS 614,055  12/1926  France.

FRANK L. ABBOTT, *Primary Examiner.*

JOEL T. REZNEK, *Examiner.*